US011425003B2

(12) United States Patent
Krayden et al.

(10) Patent No.: US 11,425,003 B2
(45) Date of Patent: Aug. 23, 2022

(54) NETWORK AWARE ELEMENT AND A METHOD FOR USING SAME

(71) Applicant: DRIVENETS LTD., Raanana (IL)

(72) Inventors: Amir Krayden, Even Yehuda (IL); Yuval Moshe, Tirat Carmel (IL); Anton Gartsbein, Kiryat Tivon (IL); Gal Zolkover, Haifa (IL); Or Sadeh, Tel Aviv (IL); Ori Zakin, Sde Varburg (IL); Yuval Lev, Gan Yavne (IL)

(73) Assignee: DRIVENETS LTD., Raanana (IL)

( * ) Notice: Subject to any disclaimer, the term of this patent is extended or adjusted under 35 U.S.C. 154(b) by 0 days.

(21) Appl. No.: 16/635,001

(22) PCT Filed: Jul. 16, 2018

(86) PCT No.: PCT/IL2018/050780
§ 371 (c)(1),
(2) Date: Jan. 29, 2020

(87) PCT Pub. No.: WO2019/026061
PCT Pub. Date: Feb. 7, 2019

(65) Prior Publication Data
US 2020/0259724 A1    Aug. 13, 2020

Related U.S. Application Data

(60) Provisional application No. 62/540,583, filed on Aug. 3, 2017.

(51) Int. Cl.
*H04L 12/24* (2006.01)
*H04L 41/50* (2022.01)
(Continued)

(52) U.S. Cl.
CPC ...... *H04L 41/5096* (2013.01); *H04L 41/5009* (2013.01); *H04L 41/5025* (2013.01); *H04L 63/02* (2013.01)

(58) Field of Classification Search
CPC ............ H04L 41/5096; H04L 41/5009; H04L 41/5025; H04L 63/02; H04L 47/125; H04L 47/724; H04L 47/803
See application file for complete search history.

(56) References Cited

U.S. PATENT DOCUMENTS 6,631,135 B1 * 10/2003 Wojcik .................. H04L 47/805
370/395.21
7,289,964 B1 * 10/2007 Bowman-Amuah ........................
G06F 9/5038
705/1.1

(Continued)

FOREIGN PATENT DOCUMENTS

GB        2481719 A    1/2012
WO    2014110293 A1   7/2014

*Primary Examiner* — Philip J Chea
*Assistant Examiner* — Wuji Chen
(74) *Attorney, Agent, or Firm* — Browdy and Neimark, PLLC

(57) ABSTRACT

A network element is provided, configured to operate in an IP-based communication network and to manage resources in that communication network which are being utilized by a software application. The management of these resources is carried out by the network element (e.g. a router) through affecting changes in these resources in response to obtaining information retrieved from an application program interface (API) associated with the software application, such as for example, values of key performance indicators (KPIs) associated with the software application.

16 Claims, 2 Drawing Sheets

(51) Int. Cl.
*H04L 41/5009* (2022.01)
*H04L 41/5025* (2022.01)
*H04L 9/40* (2022.01)

(56) References Cited

U.S. PATENT DOCUMENTS

| | | | |
|---|---|---|---|
| 9,311,158 B2* | 4/2016 | Tompkins | H04L 67/42 |
| 9,363,199 B1* | 6/2016 | McCabe | H04L 47/801 |
| 10,116,732 B1 | 10/2018 | Canton et al. | |
| 2003/0126252 A1* | 7/2003 | Abir | H04L 67/1008 709/223 |
| 2004/0019696 A1* | 1/2004 | Scott | H04L 29/06 709/242 |
| 2005/0198275 A1* | 9/2005 | D'Alo | G06F 11/3466 709/224 |
| 2006/0072541 A1* | 4/2006 | Pecus | H04L 47/787 370/351 |
| 2006/0075478 A1* | 4/2006 | Hyndman | H04L 63/029 726/11 |
| 2007/0180119 A1* | 8/2007 | Khivesara | H04L 47/762 709/226 |
| 2007/0220521 A1 | 9/2007 | Chevanne et al. | |
| 2008/0075116 A1* | 3/2008 | Holierhoek | H04L 47/70 370/468 |
| 2008/0279112 A1* | 11/2008 | Schryer | H04L 41/5061 370/465 |
| 2009/0122707 A1* | 5/2009 | Weinman | H04L 47/70 370/237 |
| 2009/0157443 A1* | 6/2009 | Gracieux | G06Q 50/06 705/63 |
| 2009/0276771 A1* | 11/2009 | Nickolov | H04L 67/1029 718/1 |
| 2009/0316707 A1* | 12/2009 | Hawley | H04L 12/2838 713/300 |
| 2011/0047591 A1* | 2/2011 | Scott | H04L 67/26 709/224 |
| 2011/0106518 A1* | 5/2011 | Shin | H04L 41/145 703/21 |
| 2011/0243072 A1* | 10/2011 | Omar | H04W 72/08 370/329 |
| 2011/0320606 A1 | 12/2011 | Madduri et al. | |
| 2013/0003531 A1* | 1/2013 | Dow | H04L 45/12 370/225 |
| 2013/0055136 A1* | 2/2013 | Aaron | H04M 15/83 715/772 |
| 2013/0185729 A1* | 7/2013 | Vasic | G06F 9/5072 718/104 |
| 2013/0254767 A1* | 9/2013 | Mizuno | H04L 41/0896 718/1 |
| 2014/0090010 A1* | 3/2014 | Fletcher | H04L 63/00 726/1 |
| 2014/0149562 A1* | 5/2014 | Xiao | H04N 21/44226 709/222 |
| 2014/0280900 A1* | 9/2014 | McDowall | H04L 45/02 709/224 |
| 2015/0103670 A1* | 4/2015 | Wu | H04L 47/2416 370/236.1 |
| 2015/0173107 A1* | 6/2015 | Newberg | H04W 76/45 455/416 |
| 2015/0254094 A1* | 9/2015 | Cao | G06F 9/5027 718/1 |
| 2015/0304187 A1* | 10/2015 | Brown | G06F 3/04817 715/736 |
| 2015/0326461 A1* | 11/2015 | Singh | H04L 43/12 709/224 |
| 2015/0334040 A1* | 11/2015 | Crowell | H04L 12/6418 709/226 |
| 2015/0373588 A1* | 12/2015 | C K | H04L 41/5022 370/329 |
| 2016/0191348 A1 | 6/2016 | Lee et al. | |
| 2016/0248624 A1* | 8/2016 | Tapia | H04L 43/065 |
| 2016/0301582 A1* | 10/2016 | Arndt | H04L 43/10 |
| 2016/0301617 A1* | 10/2016 | Peterson | H04L 47/52 |
| 2017/0048115 A1 | 2/2017 | Wang | |
| 2017/0244607 A1* | 8/2017 | Dujodwala | H04L 12/42 |
| 2017/0280296 A1* | 9/2017 | Divakaran | H04W 72/0446 |
| 2017/0374157 A1* | 12/2017 | Hu | H04L 67/142 |
| 2018/0278493 A1* | 9/2018 | Guim Bernat | H04L 5/0055 |
| 2018/0337862 A1* | 11/2018 | Sharma | H04L 45/302 |
| 2019/0319868 A1* | 10/2019 | Svennebring | H04W 24/08 |
| 2020/0029110 A1* | 1/2020 | Xin | H04L 47/78 |

\* cited by examiner

NETWORK AWARE ELEMENT AND A METHOD FOR USING SAME

TECHNICAL FIELD

The present disclosure relates generally to the field of cloud computing and networking, and in particular, to a device and a method for controlling allocation of network resources to a software application operating in a cloud environment.

BACKGROUND

Cloud computing is a technique that is being used for a wide variety of enterprise and end-user applications. Providers offer varying service portfolios that differ in resource configurations and services that can be provided. A comprehensive solution for allocation of resources is fundamental to any cloud computing service provider. Any resource allocation model has to consider available computational resources as well as network resources, to accurately reflect practical demands. Resource allocation algorithms aim to accomplish the task of scheduling virtual machines on the servers residing in data centers, in order to schedule available network resources in a way that complies with the problem constraints. Several external and internal factors that affect the performance of resource allocation models have been considered in the past.

However, as cloud computing platforms adopt virtualization as an enabling technology, it becomes an increasingly challenging task to distribute system resources to each user according to the diverse requirements.

Furthermore, although ample research has already been conducted in order to meet QoS requirements, still, the proposed solutions lack simultaneous support for multiple networks' policies, degrade the aggregated throughput of network resources, and incur CPU overhead.

One typical characteristic that is shared by the various solutions, is based on management of the computing resources by applications which are implemented in a cloud environment (either private or public environment), for example, the management is carried out by the application through adding and removing CPUs that are allocated to that specific application.

US 20110320606 describes for example a data processing system for managing network resources. Upon receiving a request for resources in the network data processing system, which comprises requested values for a plurality of attributes for the resources in the network data processing system, the potential resources in the network data processing system are identified. The request is evaluated based on proximity scores for the plurality of attributes in the potential resources relative to an ideal allocation of the potential resources and resource weights for the plurality of attributes in the potential resources.

US 20130185729 discloses an apparatus for managing resources assigned to an application or service. A resource manager maintains a set of workload classes and classifies workloads using workload signatures. For example, the resource manager minimizes or reduces resource management costs by identifying a relatively small set of workload classes during a learning phase, determining preferred resource allocations for each workload class, and then during a monitoring phase, classifying workloads and allocating resources based on the preferred resource allocation for the classified workload.

SUMMARY

The disclosure may be summarized by referring to the appended claims.

It is an object of the present disclosure to provide a system and a method for improving performance of data processing.

It is another object of the present disclosure to provide a device and a method for affecting control over network resources via a network element such as a router.

It is another object of the present disclosure to provide a device and a method to enable a software application to communicate with a router and exchange messages therewith in order to allow the router to control network resources utilized by that software application.

Other objects of the present disclosure will become apparent from the following description.

According to a first embodiment of the present disclosure, there is provided a network element (e.g. a router) operative in an IP-based communication network (e.g. a cloud computing environment in an IP-based computer network), and configured to manage resources in the communication network that are being utilized by a software application, wherein the management of resources is carried out by affecting changes in these resources in response to obtaining information retrieved from an application program interface (API) associated with the software application.

According to another embodiment, the information retrieved from the API comprises values of key performance indicators (KPIs) associated with that software application.

By yet another embodiment, the network element is a member selected from a group that comprises a router, a switch and the like.

According to another aspect of the disclosure, there is provided a method for use by a network element operative in an IP-based communication network (e.g. a cloud computing environment in an IP-based computer network), for managing resources that are being utilized by a software application, wherein the method comprises affecting changes by the network element in these resources, in response to obtaining information retrieved from an application program interface (API) associated with that software application.

In accordance with another embodiment, the information retrieved from the API comprises values of key performance indicators (KPIs) associated with said software application.

According to anther embodiment of this aspect of the disclosure, the method comprises the steps of:

(i) registering the software application with the network element;

(ii) providing the software application with information that relates to a user experience, of users communicating with the software application;

(iii) providing the network element with information that would enable the network element to affect changes in resources associated with the communication network that are being utilized by the software application; and (iv) affecting one or more changes in these resources based on the information provided in step (iii).

By still another embodiment, the method further comprising:

(v) retrieving information for assessing results of affecting at least one of the one or more changes; and (vi) providing the software application with information, based on the information retrieved in step (v).

According to yet another embodiment of this aspect of the invention, the network element is a router.

In accordance with still another embodiment, the software application is registered with the router via a network API to enable the router to identify the user experience, based on retrieved values of (KPIs) associated with the software application.

According to another embodiment, the information provided in step (ii) is information that relates to a user experience as reflected by the router and/or by the communication network.

By still another embodiment, the information that would enable the network element to affect changes in the resources provided in step (iii), comprises one or more indications that respective pre-defined KPI thresholds have been crossed.

According to still another embodiment, the changes affected in step (iv) is a member of a group that consists of: changing QoS profile, changing routing metric, and changing virtual routing and forwarding (VRF) of packets.

In accordance with another embodiment, the method provided is incorporated in a firewall activity to reduce processing load (e.g. calculations) that would otherwise be required to be carried out by the firewall in the case of an attack on the software application, which in turn would result in a request that would be initiated by the firewall to divert or block traffic at the network level.

By still another embodiment, the software application is a storage software application, and the method is configured to enable routing data being conveyed for storage by the storage software application, in case that an approach to a respective storage device is currently adversely affected by a network congestion.

According to another embodiment, the method is configured to enable allocating additional bandwidth to the software application in order to overcome a temporary performance problem associated therewith.

In accordance with yet another embodiment, the software application is configured to affect one or more temporary network operational changes in order to enhance user experience.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

Cloud computing is a form of Internet-based computing that provides shared computer processing resources and data to computers and other devices, on demand. It is a model for enabling ubiquitous, on-demand access to a shared pool of configurable computing resources (e.g., computer networks, servers, storage, applications and services), which can be rapidly provisioned and released while applying minimal management effort. Basically, cloud computing allows the users and enterprises with various capabilities to store and process their data in either privately owned cloud, or on a third-party server in order to make data accessing mechanisms much more easy and reliable. Cloud computing relies on sharing of resources to achieve coherence and economy of scale, similar to a utility (like the electricity grid) over an electricity network.

Applications that are running in a cloud environment are by definition adapted to share computing, storage and networking resources for better utilization of the available resources. The underlying assumption is that if a first application has a low demand for resources, then a second application may use these resources on request. In today's environment, computing resources may indeed be managed this way. Yet, networking resources are more complicated to manage in this manner, mainly due to the fact that the networking layer is traditionally not an integrated component of servers at which the application is installed, but is comprised of networking elements like routers and switches that are managed and dimensioned based on static configurations and pre-assumptions of the required resources for all hosted applications at a given server or data center.

Figure 1:
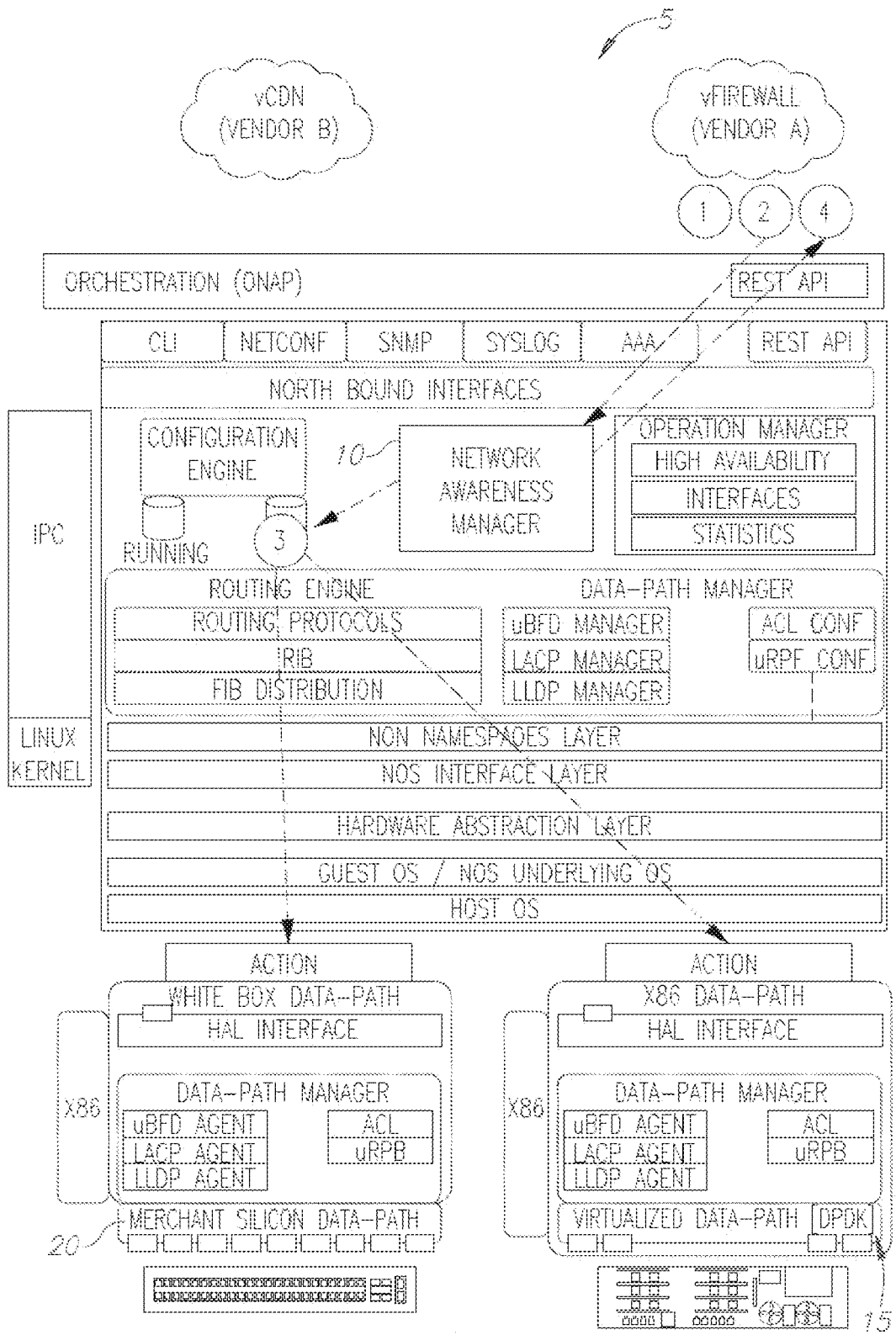
FIG. 1 illustrates a high-level schematic view of a system configured to operate by executing a closed loop algorithm for managing network resources controlled by a software application, according to an embodiment of the present invention.

FIG. 1 illustrates a high-level schematic view of a system (5) construed in accordance with an embodiment of the disclosure. System 5 is configured to operate by executing a closed loop algorithm for managing network resources that are controlled by a software application, whereas FIG. 2 exemplifies steps that are taken in order to carry out an embodiment of the present invention, by which it becomes possible to link between network security, storage, cloud computing services and other network services, thereby enabling a unique user experience with an overall better performance.

Network element 10 of FIG. 1 is a network aware manager, which, according to the present invention may be a router or a switch or any other applicable network element which can be configured to function in compliance with the principles set forth by the present disclosure. Network element 10 is depicted in FIG. 1 as a device configured to communicate with network elements 15 and 20 which may be for example physical servers and/or white boxes. The term white box is used herein to denote a commodity, being an open or industry-standard compliant hardware for switches and/or routers within the forwarding plane. White boxes provide users with the foundational hardware elements of a network.

Typically, an application program interface (hereinafter: "API") is a set of routines, protocols, and tools for building software applications. An API specifies how software components should interact. Additionally, APIs may be used when programming graphical user interface (GUI) components. A good API makes it easier to develop a program by providing all the building blocks, and then incorporating these blocks together. Most operating environments, such as MS-Windows™ for example, provide APIs, thereby allowing programmers to write applications consistent with the relevant operating environment.

According to an embodiment of the present disclosure, the network element (e.g. router 10) retrieve from the relevant API of one or more software applications, information that relates to at least the following two characteristics associated with the respective software application:
- a) Network visibility, e.g. KPIs (Key Performance Indicators) that serve as indication of the software application usage, such as TCPIP window size, retransmission of packets, and the like.
- b) Network related control and commands.

The term performance indicator or key performance indicator (KPI) as used herein throughout the specification and claims is used to denote a performance measurement. Key performance indicators define a set of values against which to measure. These raw sets of values, which are fed to systems in charge of summarizing the information, are referred to as indicators. KPIs may evaluate the performance of a particular activity associated therewith, and such an evaluation may often lead to the identification of potential improvements.

Figure 2:
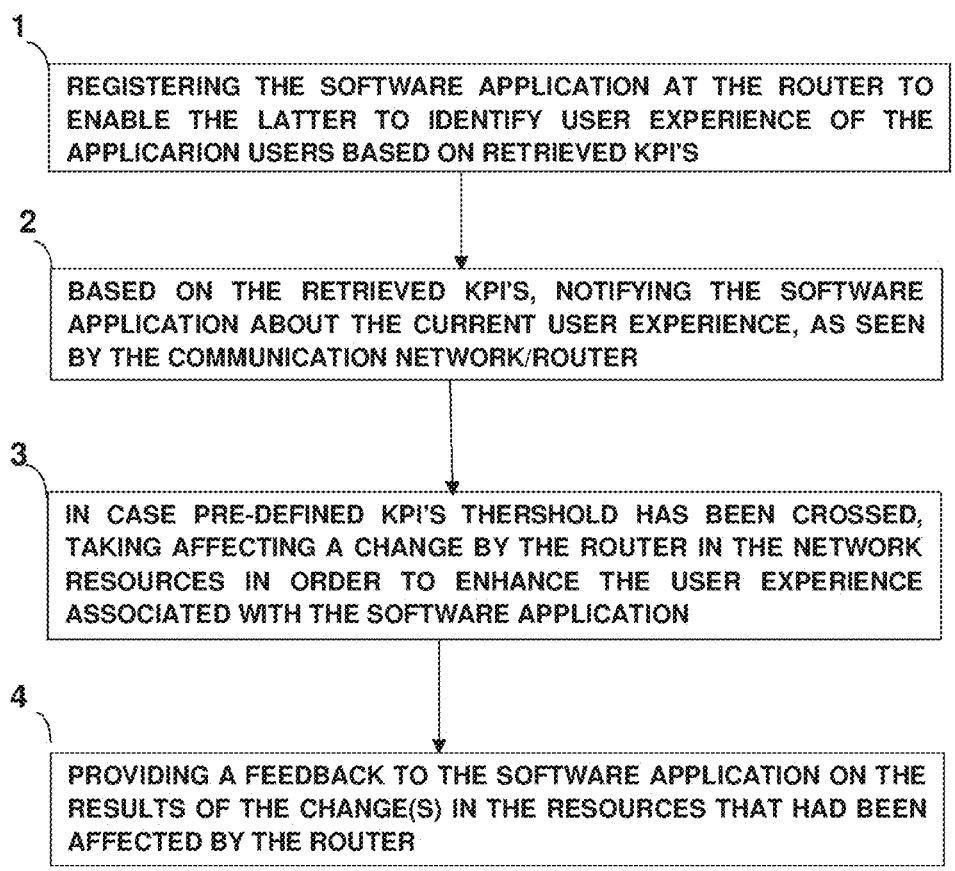
FIG. 2 presents a flow chart, illustrating a method of carrying out an embodiment of the present invention.

FIG. 2 exemplifies a method for using router 10 in accordance with an embodiment of the present invention.

Step 1—Service identification. In this step, the application is registered with the router via the network visibility API so that the router is able to identify the user experience, based on relevant KPIs once retrieved.

Step 2—Service notification. Based on the retrieved KPIs, the application is notified about the user experience, as reflected by the network/router.

Step 3—Taking an appropriate action by the network element (the router). In case that pre-defined KPIs threshold have been crossed (e.g. exceeded), the router takes an action at the network level in order to enhance the application's user experience. Such actions are for example, changing QoS profile, changing routing metric, changing virtual routing and forwarding ("VRF"), and the like.

Step 4—Feedback. After carrying out a change that has been initiated by the network element (the router), the latter evaluates the results of the affected change and then initiates conveyance of information toward the application, which enables the application to assess the new user experience achieved after the change has been affected.

Following are number of cases exemplifying various implementations of the above-described solution.

Security

The proposed solution may be used by having it integrated with firewalls. In the case of an attack on the application, the firewall may request a traffic diversion or blocking at the network level, and using the proposed solution helps in reducing the amount of processing that would otherwise be required for the firewall to carry out, thereby allowing more services to be carried out by the firewall, and consequently, to enable increasing the firewall's capacity.

Storage

The proposed solution may be used by having it integrated with storage applications. For example, in case where there is a plurality of storage devices and the approach to one or more of this plurality of storage devices is currently adversely affected by a network congestion, the respective one or more storage applications may request that the router would change the route of data being conveyed for storage by the one or more respective storage applications, to a better performing route.

Performance

The proposed solution may be used by having it integrated with the operative router, so that any application communicating with that router may request allocation of additional bandwidth for its operations in order to overcome temporary performance problems.

User Experience

The proposed solution may be used by having it integrated with the operative router, so that any application communicating with that router which suffers from a diminished user experience (as reflected by values of the relevant KPIs retrieved), may request initiating of a series of network changes in order to enhance the user experience, e.g. affecting a temporarily change to the QoS profile.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A network element operative in a cloud computing environment in an IP-based communication network, wherein said cloud computing environment being an Internet-based computing environment that provides, on demand, shared computer processing resources and data to devices comprised in said IP-based communication network, and wherein said network element is configured to manage network resources, wherein said management of the networking resources is carried out by affecting changes at the communication network level of at least one service associated with a software application, wherein said service is a member selected from among a group that consists of network security, storage and cloud computing services, wherein said changes are affected in response to obtaining information retrieved from an application program interface (API) associated with said software application and wherein said obtained information comprises network related control commands, and information that relates to current usage of said software application by users communicating with said software application thereby enabling said network element to identify a user's experience of users communicating with said software application.

2. The network element of claim 1, wherein the information retrieved from the API comprises values of key performance indicators (KPIs) associated with said software application.

3. The network element of claim 1, wherein said network element is a router.

4. A method for use by a network element operative in a cloud computing environment in an IP-based communication network, wherein said cloud computing environment being an Internet-based computing environment that provides, on demand, shared computer processing resources and data to devices comprised in said IP-based communication network, wherein said method is adapted for use in managing shared network resources, wherein said method comprises affecting changes at the communication network level of at least one service associated with a software application, wherein said service is a member selected from among a group that consists of network security, storage and cloud computing services, wherein said changes are affected in response to obtaining information retrieved from an application program interface (API) associated with said software application, and wherein said obtained information comprises network related control commands, and information that relates to current usage of said software application by users communicating with said software application, thereby enabling said network element to identify a user's experience of users communicating with said software application.

5. The method of claim 4, wherein the information retrieved from the API comprises values of key performance indicators (KPIs) associated with said software application.

6. The method of claim 5, wherein the method comprises the steps of:
   (i) registering said software application with the network element;
   (ii) providing said software application with information that relates to a user experience of users communicating with said software application;
   (iii) providing the network element with information that would enable the network element to affect changes in resources associated with the communication network that are being utilized by the software application; and
   (iv) affecting one or more changes in said resources based on the information provided in step (iii).

7. The method of claim 6, wherein said method further comprising:
   (v) retrieving information for assessing results of affecting at least one of the one or more changes; and
   (vi) providing said software application with information, based on the information retrieved in step (v).

8. The method of claim 6, wherein said network element is a router.

9. The method of claim 8, wherein said software application is registered with the router via a network API to enable said router to identify the user experience, based on retrieved values of (KPIs) associated with said software application.

10. The method of claim 6, wherein the information provided in step (ii) is information that relates to a user experience as reflected by said router and/or by said communication network.

11. The method of claim 6, wherein the information that enables said network element to affect changes in said resources provided in step (iii) comprises one or more indications that respective pre-defined KPI thresholds have been crossed.

12. The method of claim 6, wherein the changes affected in step (iv) is a member of a group that consists of: changing QoS profile, changing routing metric, and changing virtual routing and forwarding (VRF) of packets.

13. The method of claim 6, wherein said method is incorporated in a firewall activity to reduce processing calculations that are required to be carried out by the firewall, in the case of an attack on the software application, which results in a request initiated by the firewall to divert or block traffic at the network level.

14. The method of claim 6, wherein said software application is a storage software application, and wherein said method is configured to enable routing data being conveyed for storage by the storage software application in case that an approach to a respective storage device is currently adversely affected by a network congestion.

15. The method of claim 6, wherein the method is configured to enable allocating additional bandwidth to the software application in order to overcome a temporary performance problem associated therewith.

16. The method of claim 6, wherein said software application is configured to affect one or more temporary network operational changes in order to enhance a user experience.

* * * * *